(12) United States Patent
Bremer

(10) Patent No.: US 8,910,996 B2
(45) Date of Patent: Dec. 16, 2014

(54) TARP DEPLOYING DEVICE FOR REAR DUMP TRAILER

(71) Applicant: Sioux City Tarp, Inc., Sioux City, IA (US)

(72) Inventor: Donald William Bremer, Sioux City, IA (US)

(73) Assignee: Sioux City Tarp, Inc., Sioux City, IA (US)

( * ) Notice: Subject to any disclaimer, the term of this patent is extended or adjusted under 35 U.S.C. 154(b) by 0 days.

(21) Appl. No.: 13/842,294

(22) Filed: Mar. 15, 2013

(65) Prior Publication Data

US 2014/0203589 A1 Jul. 24, 2014

Related U.S. Application Data

(60) Provisional application No. 61/756,011, filed on Jan. 24, 2013.

(51) Int. Cl.
*B60J 11/00* (2006.01)
*B60P 7/04* (2006.01)

(52) U.S. Cl.
CPC .................................. *B60P 7/04* (2013.01)
USPC ................................ 296/98; 296/100.14

(58) Field of Classification Search
USPC .................... 296/98, 100.14, 100.15, 100.1
See application file for complete search history.

(56) References Cited

U.S. PATENT DOCUMENTS

| | | | |
|---|---|---|---|
| 8,205,927 B2 * | 6/2012 | Eggers | 296/98 |
| 2010/0219656 A1 * | 9/2010 | Chenowth et al. | 296/98 |
| 2010/0230993 A1 * | 9/2010 | Bremer | 296/98 |
| 2011/0115247 A1 * | 5/2011 | Eggers | 296/98 |

* cited by examiner

*Primary Examiner* — Lori L Lyjak
(74) *Attorney, Agent, or Firm* — McKee, Voorhees & Sease

(57) ABSTRACT

A tarp deploying apparatus includes radial arm with a proximal arm and a distal arm. The distal arm is formed from a flexible material such as a double-walled hydraulic hose. The distal arm attaches to a tarp roller having a splined end. The distal arm is selectively removable from the distal arm to permit a hand crank with a female splined socket to be attached to the splined end of the tarp roller to permit hand operation of the tarp deploying system when the electric motor is not functional. A mounting bracket including two feet, a pair of legs and a support span allows easy mounting of the tarp deploying apparatus.

15 Claims, 5 Drawing Sheets

TARP DEPLOYING DEVICE FOR REAR DUMP TRAILER

PRIORITY

This application claims priority from U.S. Provisional Application Ser. No. 61/756,011, filed Jan. 24, 2013, the entire contents of which are hereby incorporated in their entirety by reference.

FIELD OF THE INVENTION

This invention relates generally to the field of tarp deploying devices for use on trailers.

BACKGROUND OF THE INVENTION

Trailers used to haul loose materials such as dirt, sand, gravel, or grain commonly have beds or tubs that have an open top with generally vertical front and rear walls and sloping sidewalls for retaining contents within the trailer. Therefore, if the trailer bed is not covered as the trailer is pulled over the road, the loose contents may be blown and scattered out of the open top of the trailer bed. Additionally, the contents of the trailer bed may be compromised by rain, or other contaminants. Accordingly, it is known to deploy tarps across the open top space of the trailer beds to cover the contents of the trailer beds.

Several mechanisms have been devised for deploying the tarps across the trailer bed. Many of these devices include radial arms that are rotatably mounted at the front and rear of the tub and have a roll of tarp disposed between them. As the radial arms rotate in one direction across the truck bed, the roll of tarp between the arms is unrolled to cover the contents of the truck bed. When the arms are rotated back in the opposite direction, the tarp is taken back up upon the roll to uncover the trailer bed. Examples of such devices may be seen in Searfoss, U.S. Pat. No. 6,206,449 and in Michel, U.S. Pat. No. 5,002,328.

Rear dump trailers are able to dump their contents by raising the forward end of the tub and releasing a rear door or flap to permit the contents of the tub to slide out under the bottom of the door or flap. Typically the radial arm of the tarp deploying apparatus will be mounted to the rear door or flap. Therefore, there needs to be flexibility between the radial arm and the tarp roll as the angle between the radial arm and the tarp roll will increase as the rear door is allowed to rotate open during a dumping procedure. One known mechanism for permitting such flexibility is to use a helical spring to form all or part of the radial arm. Unfortunately these springs can be relatively expensive, are somewhat prone to corrosion, and can be dangerous if not properly covered.

Another disadvantage of existing designs results if the motor or other power source for the tarp roll is not functional. Under existing designs, there is no satisfactory mechanism for rolling the tarp up.

Additionally, an improved bracket for mounting radial-arm-type tarp deploying systems is needed that permits flexibility in mounting location and eliminates the need for mounting multiple pieces of the bracket.

BRIEF SUMMARY OF THE INVENTION

According to one embodiment the present invention relates to a tarp deploying device that utilizes a double-walled hydraulic hose as a portion of a radial arm to provide flexibility between the radial arm and a tarp roll.

According to another embodiment, the present invention relates to a tarp deploying apparatus wherein a radial arm is readily detachable from the tarp roll to expose a splined shaft extending from the tarp roll, such that a manual crank can be attached to the splined shaft to permit manual rolling of the tarp.

According to another embodiment, the present invention relates to a tarp deploying apparatus that utilizes a one-piece mounting bracket.

According to another embodiment, the present invention is directed to a tarp deploying apparatus that has a mounting bracket attached to a rear flap of a tub of a rear-dump trailer. A proximal radial arm is pivotally mounted to the mounting bracket. A distal arm extends from the proximal radial arm, the distal arm being flexible. A universal joint is provided at a free end of the distal arm. The universal joint includes a connection portion for selective connection to a rear portion of a tarp spindle. The tarp spindle has a tarp rolled upon it. A rear portion of the tarp spindle includes a spline portion for engagement with a hand crank when the connection portion of the universal joint is disconnected from the tarp spindle. The distal radial arm may be a double-walled hydraulic hose. The connection portion of the universal joint may include a socket that captures the rear portion of the tarp spindle to connect the rear portion of the tarp spindle to the universal joint. The socket may have a greater inner diameter than an outer diameter of the spline portion. The socket may have a smooth inner diameter that permits the spline portion to rotate freely within the socket. A removable catch pin may be provided in engagement with the socket to retain the spline portion within the socket and to permit quick release of the spline portion from the socket when the catch pin is removed from the socket. The catch pin may be a threaded member. The spline portion may include a circumferential groove engaged by the catch pin to retain the spline portion within the socket. The mounting bracket may include a first foot having a first plurality of mounting holes. The mounting bracket may also include a second foot laterally spaced apart from the first foot, the second foot having a second plurality of mounting holes. The second foot may also have a first end and second end, the first end of the second foot being closer to the first foot than the second end of the second foot. The mounting bracket may also include a first spacer leg having a first end at the first foot and a second end opposite from the first end. The first spacer leg may extend generally perpendicularly from the first foot. The mounting bracket may also include a flat support span having a first end and a second end, the first end of the flat support span extending from the second end of the first spacer leg such that it is generally parallel to and covering the first foot. An angled spacer leg may extend at an obtuse angle from the second end of the flat support span to the first end of the second foot.

According to another embodiment the present invention is directed to a tarp deploying apparatus that has a mounting bracket attached to a rear flap of a tub of a rear-dump trailer. A proximal radial arm is pivotally mounted to the mounting bracket. A distal arm extends from the proximal radial arm. The distal arm includes a double-walled hydraulic hose. A universal joint is provided at a free end of the distal arm. The universal joint has a connection portion for selective connection to a rear portion of a tarp spindle. A tarp is rolled upon the tarp spindle. A rear portion of the tarp spindle may include a spline portion for engagement with a hand crank when the connection portion of the universal joint is disconnected from the tarp spindle.

1. According to yet another embodiment, the present invention is directed to a mounting bracket. The mounting bracket includes a first foot having a first plurality of mounting holes. A second foot is laterally spaced apart from the first foot, the second foot having a second plurality of mounting holes. The second foot also has a first end and second end, the first end of the second foot being closer to the first foot than the second end of the second foot. A first spacer leg has a first end at the first foot and a second end opposite from the first end. The first spacer leg extends generally perpendicularly from the first foot. A flat support span has a first end and a second end, the first end of the flat support span extending from the second end of the first spacer leg such that it is generally parallel to and covering the first foot. An angled spacer leg extends at an obtuse angle from the second end of the flat support span to the first end of the second foot. A pin may extend from a central portion of the flat support span to pivotally support a radial arm. The pin may extend through an opening in the central portion of the flat support span. The pin may have a longitudinal slot formed along a bottom of the pin for engagement with a radial spring.

BRIEF DESCRIPTION OF THE DRAWINGS

FIG. 4b is a side detail view of the connection of FIG. 4a.

DETAILED DESCRIPTION OF THE PREFERRED EMBODIMENT

Figure 1:
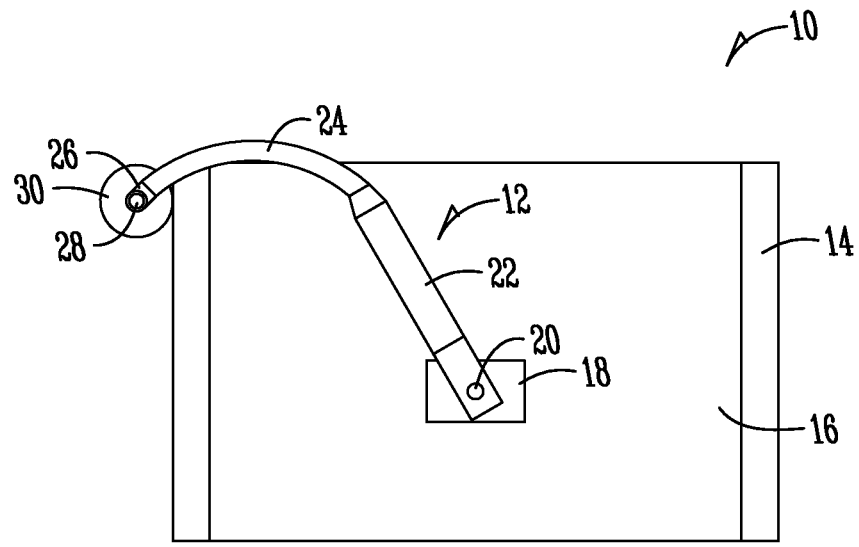
FIG. 1 is rear view of a truck with a tarp deploying device according to the present invention attached in a rolled-up position.
Figure 2:
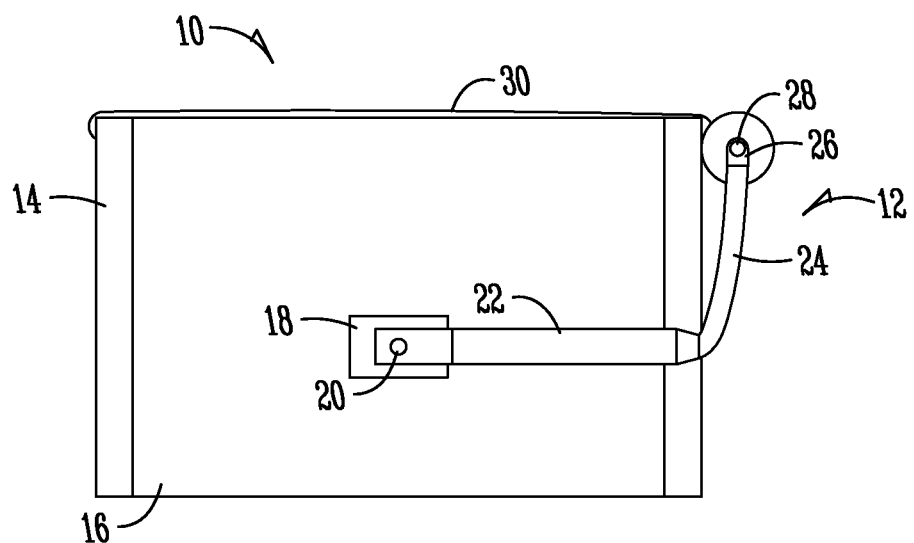
FIG. 2 is a rear view of the truck and tarp deploying apparatus of FIG. 1 with the tarp deploying apparatus in a fully deployed position.

FIGS. 1 and 2 show a rear dump trailer 10 with a tarp deploying apparatus 12 according to one embodiment of the present invention. The trailer includes a tub 14 with a rear flap or door 16. The flap or door 16 is pivotally mounted near its top to the tub 14 such that it can rotate open when the tub 14 is tilted (see FIG. 3). In FIG. 1 the tarp deploying apparatus 12 is in an open configuration with the top of the tub 14 uncovered. FIG. 2, the tarp deploying apparatus 12 is in a closed or fully deployed configuration, with the tarp 30 covering the tub 14.

The tarp deploying apparatus 12 includes a mounting bracket 18 fixed to the flap or door 16. The mounting bracket 18 includes a pin 20. A proximal radial arm 22 is pivotally mounted to pin 20. The proximal radial arm 22 should be made of a durable rigid material, such as steel or aluminum. At the free end of the proximal radial arm 22 a flexible distal radial arm 24 is mounted. According to a preferred embodiment, the distal radial arm 24 may be formed from a double-walled hydraulic hose. Alternatively, the distal radial arm 24 may be formed from a helical spring or a helical spring provided within a flexible cover. At the free end of the distal radial arm 24 a universal joint 26 is attached. The universal joint is connected to a tarp roller 28. FIG. 1 shows the tarp deploying apparatus 12 in an open configuration.

Figure 3:
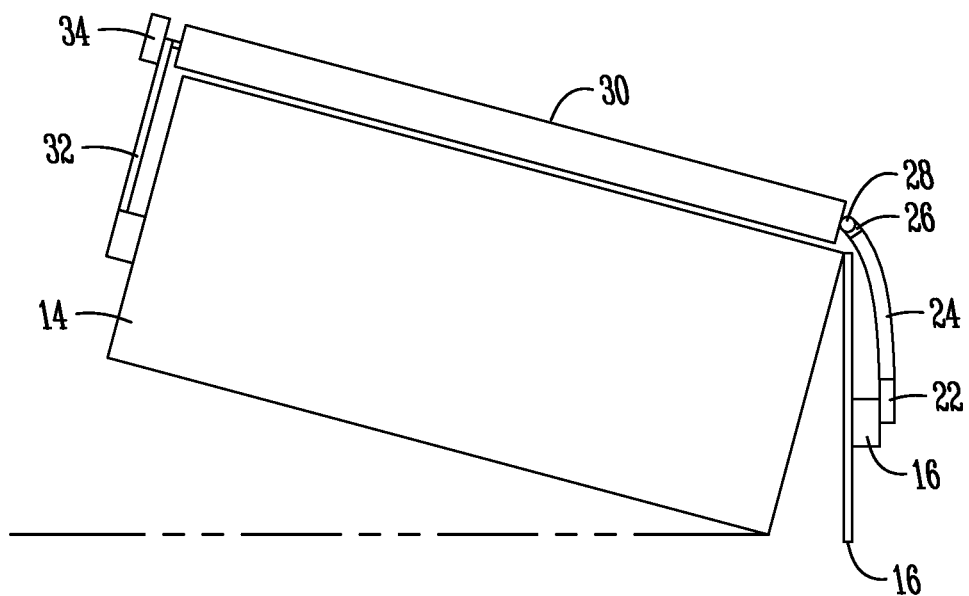
FIG. 3 is a side elevation view of the truck and tarp deploying apparatus of FIG. 1, with a front portion of the tub raised to a dumping position.

As can be seen in FIG. 3, a front radial arm assembly 32 may be provided to help suspend and move the tarp 30. The front radial arm assembly 32 preferably includes an electric motor 34 to deploy the tarp and to roll the tarp 30 back up to the open configuration of FIG. 1. Examples of suitable radial arm assemblies and motors may be found in U.S. Pat. No. 8,272,676, the entire contents of which are incorporated by reference.

The proximal radial arm 22 is biased towards the closed deployed configuration of FIG. 2 by a set of coil springs (not shown) that are provided between the mounting bracket 18 and the proximal arm 22. In FIG. 2, the tarp 30 is fully deployed covering the open top of the tub 14. In practice bows (not shown) or similar structures may be provided to support the deployed tarp 30 above the top of the tub 14. The motor may be used to roll the tarp 30 part way back on to the tarp roller 28 to maintain the tarp 30 in in a tight secure final closed position. To move the tarp 30 back towards the open configuration, the motor (not shown) may be operated in the reverse direction to wind the tarp 30 back up onto the tarp roll, causing the radial arms 22 and 24 to rotate back towards the open position (counter clockwise in FIGS. 2 and 3). The springs (not shown) that urge the proximal arm 22 towards the closed deployed position hold the tarp 30 tight as it is rolled back up on to the tarp roller 28.

FIG. 3 shows the tub 14 in a tilted position to dump any contents of the tub 14 rearwardly as the rear flap 16 is permitted to swing outwardly from the tub 14 under the force of gravity. A releasable latch of some type (not shown) will generally be provided that must be released to permit dumping. It should be appreciated that the tub 14 will be mounted on a trailer provided with a hydraulic lift, as is well known of rear-dump trailers. The flexible distal arm 24 provides a connection between the proximal arm 22 and the tarp roll 22 that is flexible and can vary angularly to permit the swinging open of the rear flap 16 without disconnecting the radial arm assembly from the tarp roller 28.

Figure 4A:
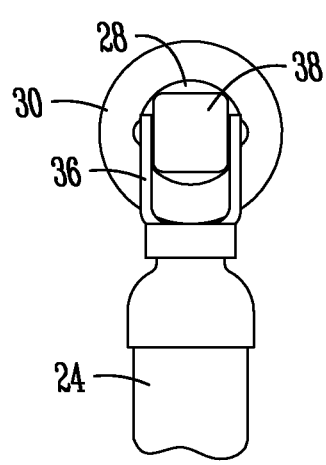
FIG. 4a is a rear detail view of the connection between the radial arm and the tarp roll, according to one embodiment of the present invention.
Figure 4B:
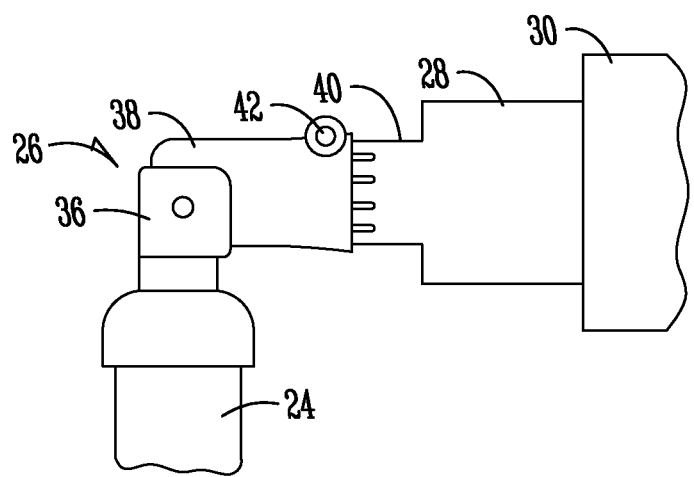

FIGS. 4a and 4b show the connection between the distal arm 24 and the tarp roller 28 that is accomplished through universal joint 26. The universal joint 26 includes a base 36 pivotally attached to socket portion 38. The socket portion 38 receives a splined end 40 of tarp roller 28. The inner surface (not shown) of the socket portion 38 is of slightly greater inner diameter than the outer diameter of the splined end 40 of the tarp roller 28, such that the splined end 40 will freely rotate within the socket 38. Preferably the inner surface (not shown) of the socket 38 will be smooth so as not to grab or catch against the splines of the splined end 40 as the tarp roller 28 rotates. A catch pin 42, which can be selectively removed, is provided in engagement with the socket portion 38 of the universal joint 26. As best seen in FIG. 5b, the splined end 40 includes a circumferential groove 42 that aligns with and is engaged by the catch pin 42 to retain the splined end 40 within the socket portion 38. As an alternative to the removable catch pin 42, a sliding collar (not shown) with catch bearings similar to those used on power takeoffs might be substituted on the socket portion 38 to releasably attach socket portion 38 and the splined end 40.

On rare occasions the electric motor 34 may be inoperable, either because of failure of the motor or lack of a power source. In that case it becomes necessary to deploy the tarp 30 without the use of the motor 34. According to the present invention this can be easily accomplished by disconnecting the socket portion 38 of the universal joint 26 from the splined end 40 of the tarp roller 28. The catch pin 42 is withdrawn from the socket potion 38, for example by unscrewing it if it is a threaded fastener, and the socket portion 38 is then pulled off of the splined end 40. The flexible distal arm 24 permits disconnection without the need to remove the arms 22, 24 from the mounting bracket 18.

Figure 5A:
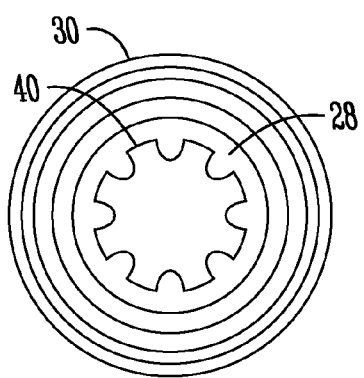
FIG. 5a is a rear detail view of the tarp roll of FIG. 4a, with the radial arm removed.
Figure 5B:
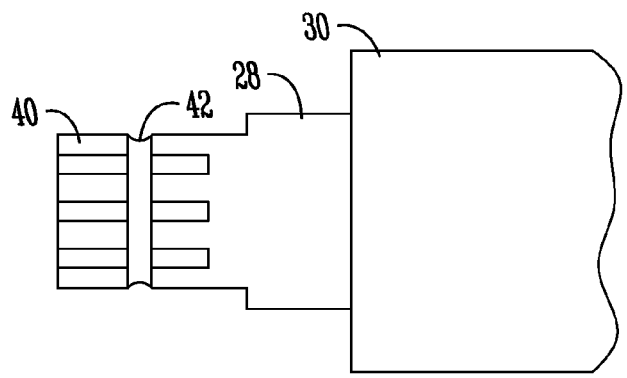
FIG. 5b is a side detail view of the tarp roll of FIG. 4b with the radial arm removed.
Figure 6:
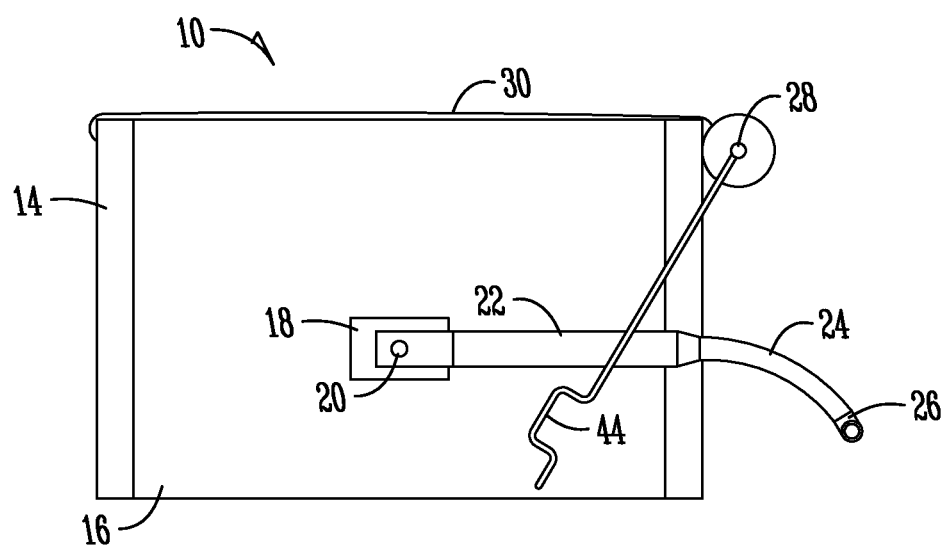
FIG. 6 is a rear view of the tarp deploying apparatus of FIG. 1 with the radial arm detached from the tarp roll and a hand crank attached.

With the socket portion 38 removed, the splined end 40 is exposed as shown in FIGS. 5a, 5b, and 6. A crank handle 44 that includes a universal joint having a socket with a female spline pattern to mate with the splined end 40 of the tarp roller 28 may then be used to manually roll the tarp roller 28. A standard crank handle used in manual tarp deploying systems, for example as shown in U.S. Pat. No. 4,302,043, the entire contents of which are hereby incorporated by reference, may be utilized.

Figure 7:
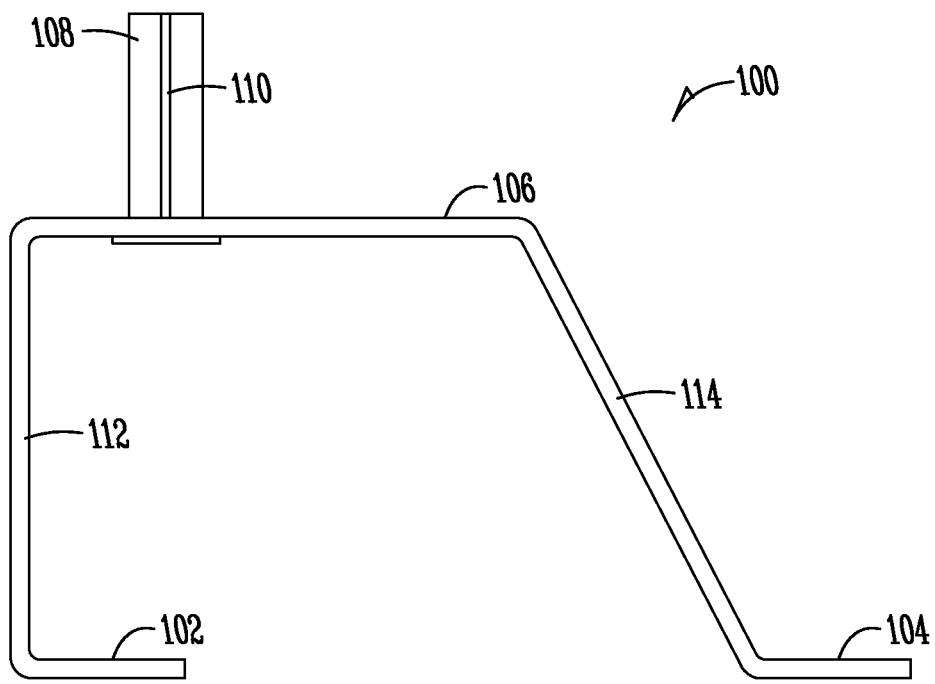
FIG. 7 is a bottom plan view of a mounting bracket according to one embodiment of the present invention.
Figure 8:
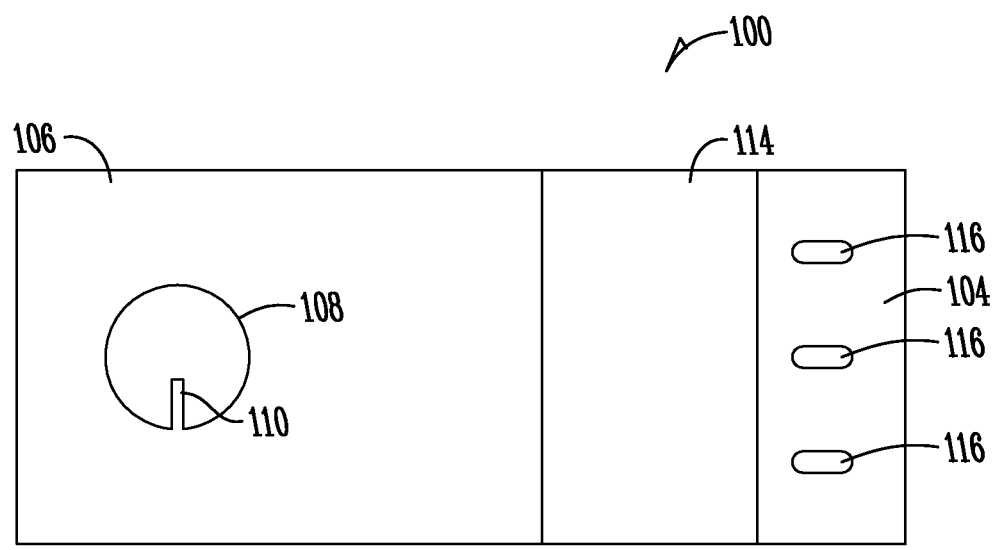
FIG. 8 is a rear elevation view of the mounting bracket of FIG. 7.

FIGS. 7 and 8 illustrate a preferred embodiment for a mounting bracket 100. The mounting bracket 100 may be used as the mounting bracket 18 shown in the preceding drawings. However, the mounting bracket 100 may be used with a wide variety of electric tarp deploying systems and is not limited to use with the rear dump deploying system 12 shown in the preceding drawings. For example the bracket 100 would be well-suited for use with the arms shown in U.S. Pat. No. 8,272,676 and other side dump and end dump systems. The bracket includes two feet 102 and 104. A flat support span 106 supports a pin 108. The pin 108 may be secured to the flat support span 106 in a variety of fashions. According to one embodiment the pin 108 extends through an opening in the flat support span 106 and is welded in place. The pin 108 is preferably formed from a solid piece of steel or aluminum. A longitudinal slot 110 is machined, or otherwise formed, along a bottom of the pin 108. The longitudinal slot 110 should preferably extend nearly to the center of the pin 108. The slot 110 may have a width of about ⅜ of an inch according to one embodiment. The purpose of the slot is to receive an end portion of one or more coil springs (not shown) that are used to bias radial arms that are mounted on and pivot about the pin 108.

A first spacer leg 112 extends at a right angle between the first foot 102 and the flat support span 106, such that the foot 102 extends directly below and is covered by the flat support span 106. An angled spacer leg 114 extends angularly outwardly from the flat support span 106 to the second foot 104, such that the second foot 104 is extended away from the flat support span 106. Each of the feet 102 and 104 include a plurality of mounting holes 116 to permit the bracket 100 to be fastened to a tub. As shown in FIG. 8, it is preferred to use elongated slots on the openings of at least the extended foot 104 so that there is some play possible in aligning the mounting holes 116 with their mounting hardware. Preferably the feet 102 and 104, the spacer legs 112 and 114 and the flat support span 106 will all be formed from a single flat strip of steel. The flat strip of steel may have the mounting holes 116 and the opening for the pin 108 formed and then be bent into shape to form the feet 102 and 104, legs 112 and 114 and the flat support span 106. The pin 108 can then be welded into place. The bracket 100 can be attached to a tub by using standard mounting hardware. The bracket 100 is suitable for use in supporting front and rear radial arms for a wide variety of tarp deploying devices. It avoids the need for a base and bracket arrangement that is commonly used.

What is claimed is:

1. A tarp deploying apparatus comprising:
    a mounting bracket attached to a rear flap of a tub of a rear-dump trailer;
    a proximal radial arm pivotally mounted to the mounting bracket;
    a distal arm extending from the proximal radial arm, the distal arm being flexible;
    a universal joint at a free end of the distal arm, the universal joint including a connection portion for selective connection to a rear portion of a tarp spindle;
    a tarp rolled upon the tarp spindle, and
    wherein a rear portion of the tarp spindle includes a spline portion for engagement with a hand crank when the connection portion of the universal joint is disconnected from the tarp spindle.

2. The tarp deploying apparatus of claim 1, wherein the distal radial arm comprises a double-walled hydraulic hose.

3. The tarp deploying apparatus of claim 1, wherein the connection portion of the universal joint includes a socket that captures the rear portion of the tarp spindle to connect the rear portion of the tarp spindle to the universal joint.

4. The tarp deploying apparatus of claim 3, wherein the socket has a greater inner diameter than an outer diameter of the spline portion.

5. The tarp deploying apparatus of claim 4, wherein the socket has a smooth inner diameter that permits the spline portion to rotate freely within the socket.

6. The tarp deploying apparatus of claim 3, wherein a removable catch pin is provided in engagement with the socket to retain the spline portion within the socket and to permit quick release of the spline portion from the socket when the catch pin is removed from the socket.

7. The tarp deploying apparatus of claim 6, wherein the catch pin is a threaded member.

8. The tarp deploying apparatus of claim 6, wherein the spline portion includes a circumferential groove engaged by the catch pin to retain the spline portion within the socket.

9. The tarp deploying apparatus of claim 1, wherein the mounting bracket comprises:
    a first foot including a first plurality of mounting holes;
    a second foot laterally spaced apart from the first foot, the second foot including a second plurality of mounting holes, the second foot having a first end and second end, the first end of the second foot being closer to the first foot than the second end of the second foot;
    a first spacer leg having a first end at the first foot and a second end opposite from the first end, the first spacer leg extending generally perpendicularly from the first foot;
    a flat support span having a first end and a second end, the first end of the flat support span extending from the second end of the first spacer leg such that it is generally parallel to and covering the first foot;
    an angled spacer leg extending at an obtuse angle from the second end of the flat support span to the first end of the second foot.

10. A tarp deploying apparatus comprising:
    a mounting bracket attached to a rear flap of a tub of a rear-dump trailer;
    a proximal radial arm pivotally mounted to the mounting bracket;
    a distal arm extending from the proximal radial arm, the distal arm comprising a double-walled hydraulic hose;

a universal joint at a free end of the distal arm, the universal joint including a connection portion for selective connection to a rear portion of a tarp spindle;

the tarp spindle having a tarp rolled upon the tarp spindle.

11. The tarp deploying apparatus of claim 10, wherein a rear portion of the tarp spindle includes a spline portion for engagement with a hand crank when the connection portion of the universal joint is disconnected from the tarp spindle.

12. A mounting bracket for a tarp deploying apparatus of the type that includes a radial arm that supports a tarp roll, the bracket comprising:

a first foot including a first plurality of mounting holes;

a second foot laterally spaced apart from the first foot, the second foot including a second plurality of mounting holes, the second foot having a first end and second end, the first end of the second foot being closer to the first foot than the second end of the second foot;

a first spacer leg having a first end at the first foot and a second end opposite from the first end, the first spacer leg extending generally perpendicularly from the first foot;

a flat support span having a first end and a second end, the first end of the flat support span extending from the second end of the first spacer leg such that the flat support span is generally parallel to and covering the first foot; and an angled spacer leg extending at an obtuse angle from the second end of the flat support span to the first end of the second foot.

13. The mounting bracket of claim 12, wherein a pin extends from a central portion of the flat support span for pivotally supporting a radial arm.

14. The mounting bracket of claim 13, wherein the pin extends through an opening in the central portion of the flat support span.

15. The mounting bracket of claim 13, wherein the pin has a longitudinal slot formed along a bottom of the pin for engagement with a radial spring.

* * * * *